(12) United States Patent
Otsuka

(10) Patent No.: US 7,729,899 B2
(45) Date of Patent: Jun. 1, 2010

(54) DATA CLEANSING SYSTEM AND METHOD

(75) Inventor: Nobuo Otsuka, San Francisco, CA (US)

(73) Assignee: Basis Technology Corporation, Cambridge, MA (US)

(*) Notice: Subject to any disclaimer, the term of this patent is extended or adjusted under 35 U.S.C. 154(b) by 781 days.

(21) Appl. No.: 11/702,811

(22) Filed: Feb. 6, 2007

(65) Prior Publication Data

US 2008/0189316 A1 Aug. 7, 2008

(51) Int. Cl.
*G06F 17/28* (2006.01)
*G06F 17/27* (2006.01)

(52) U.S. Cl. .............................. 704/2; 704/9
(58) Field of Classification Search ....................... None
See application file for complete search history.

(56) References Cited

U.S. PATENT DOCUMENTS

| 5,062,143 | A | 10/1991 | Schmitt |
| 5,548,507 | A | 8/1996 | Martino et al. |
| 6,167,369 | A * | 12/2000 | Schulze .......................... 704/9 |
| 6,606,659 | B1 * | 8/2003 | Hegli et al. .................. 709/225 |
| 6,704,698 | B1 | 3/2004 | Paulsen, Jr. et al. |
| 6,925,432 | B2 * | 8/2005 | Lee et al. ....................... 704/5 |
| 7,191,116 | B2 * | 3/2007 | Alpha ........................... 704/8 |
| 7,386,438 | B1 * | 6/2008 | Franz et al. ..................... 704/8 |
| 2002/0116291 | A1 | 8/2002 | Grasso et al. |
| 2003/0176996 | A1 | 9/2003 | Lecarpentier |
| 2004/0002994 | A1 | 1/2004 | Brill et al. |
| 2005/0120011 | A1 | 6/2005 | Dehlinger et al. |
| 2006/0047617 | A1 | 3/2006 | Bacioiu et al. |

* cited by examiner

*Primary Examiner*—Matthew J Sked
(74) *Attorney, Agent, or Firm*—Sampson & Associates, P.C.

(57) ABSTRACT

An automated system and method is provided for debugging training data used to train an automated language identifier. The system and method collects texts written in a particular language, generates an occurrence count for words in each text by counting the number of times each of the words is found within the text, and generates an occurrence ratio (OR) of each of the words by dividing the occurrence count by the total number of words in each text. Words are then filtered from the texts in which their occurrence ratios are substantially higher than their occurrence ratios in at least one of the other texts, to generate a clean text.

32 Claims, 2 Drawing Sheets

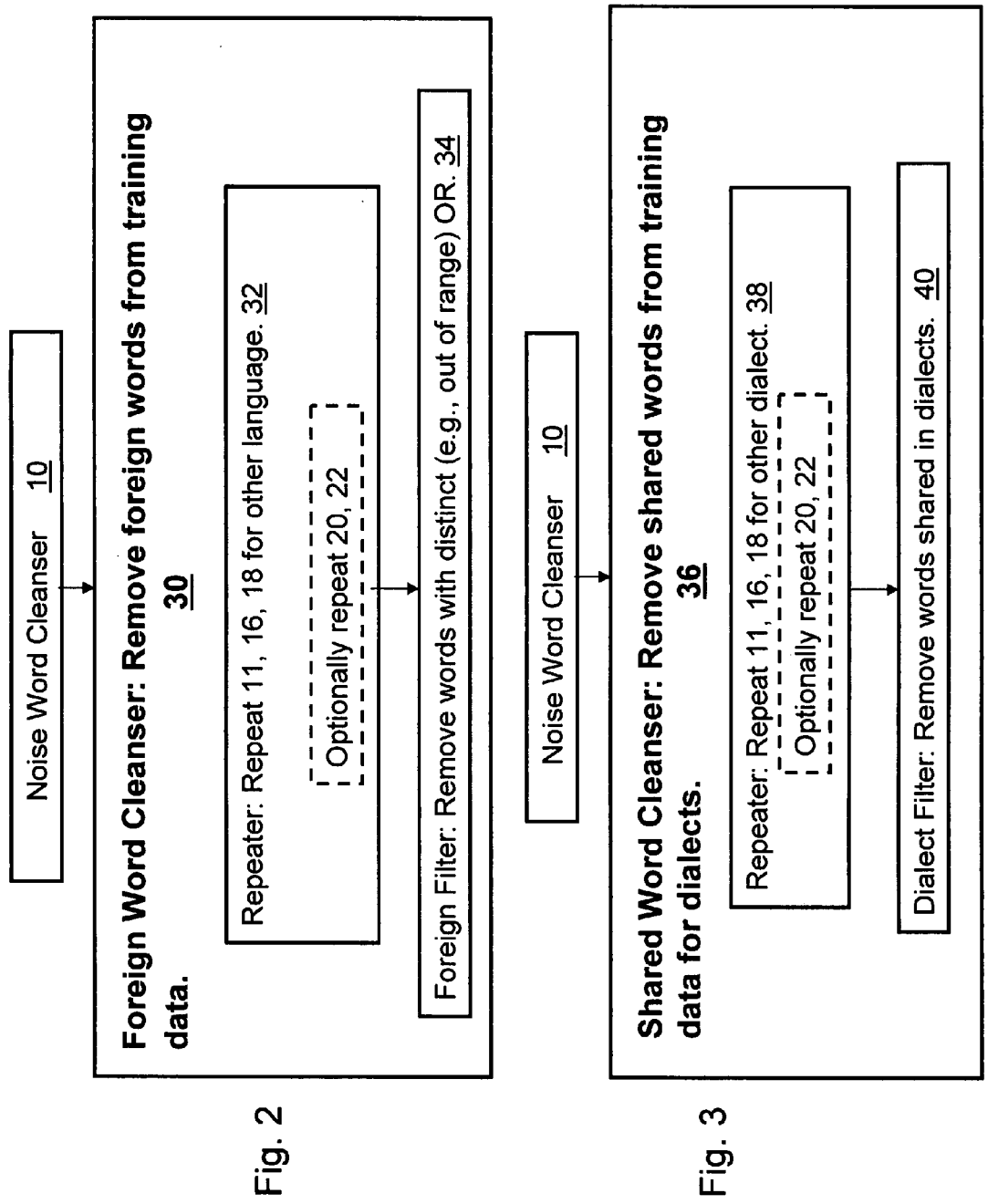

DATA CLEANSING SYSTEM AND METHOD

BACKGROUND

1. Technical Field

This invention relates to automated language translation. More particularly, the invention relates to the automated removal of noise words and foreign words from language text data used to train automatic language translators.

2. Background Information

Throughout this application, various publications, patents and published patent applications are referred to by an identifying citation. The disclosures of the publications, patents and published patent applications referenced in this application are hereby incorporated by reference into the present disclosure.

Most data used to train automated language identification systems such as the Rosette® Language Identifier (RLI) (Basis Basis Technology Corp., Cambridge, Mass.), are collected from the World Wide Web and contain English or other noise words. These noise words may lead to misidentification of the given language as well as reduced accuracy rates of (e.g., English) text detection.

Heretofore, there were generally no efficient techniques for removing these unwanted words, other than having human eyes go through the text word by word. This approach tends to be undesirably labor intensive, as typical training text data may be megabytes in size, including millions of words.

A need therefore exists for enabling the automated cleaning of relatively large amounts of training text.

SUMMARY

In an aspect of the invention, an automated method is provided for debugging training data used to train an automated language identifier. The method includes collecting a text written in a particular language, generating an occurrence count for words in the text by counting the number of times each of the words is found within the text, and generating an occurrence ratio (OR) of each of the words by dividing the occurrence count by the total number of words in each text. The above is repeated to generate ORs for a plurality of texts. Words are then filtered from the texts in which their OR is substantially distinct (e.g., higher) than in another text, to generate a clean text.

Another aspect of the invention includes an automated system for debugging training data used to train an automated language identifier. The system includes a text collection module configured for collecting a plurality of texts in a particular language, a scanning module configured for generating an occurrence count for each of a plurality of words, by counting the number of times each of the words is found within the text, and an occurrence ratio (OR) generator configured to divide the occurrence count for each word by substantially the total number of words in each text. A filter is configured to remove words from one of the texts which have ORs higher than in at least one other text, to generate a clean text.

Still another aspect of the invention includes an article of manufacture for debugging training data used to train an automated language identifier. The article of manufacture includes a computer usable medium having a computer readable program code embodied therein. The program code is configured for collecting a text written in a particular language, generating an occurrence count for words in the text by counting the number of times each of the words is found within the text, and generating an occurrence ratio (OR) of each of the words by dividing the occurrence count by the total number of words in each text. The program code is configured to repeat the above, to generate ORs for a plurality of texts. Words are then filtered from the texts in which their OR is substantially distinct (e.g., higher) than in another text, to generate a clean text.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 2 and 3 are views similar to that of FIG. 1, of additional aspects that may optionally be used in combination with the embodiment of FIG. 1.

DETAILED DESCRIPTION

Figure 1:
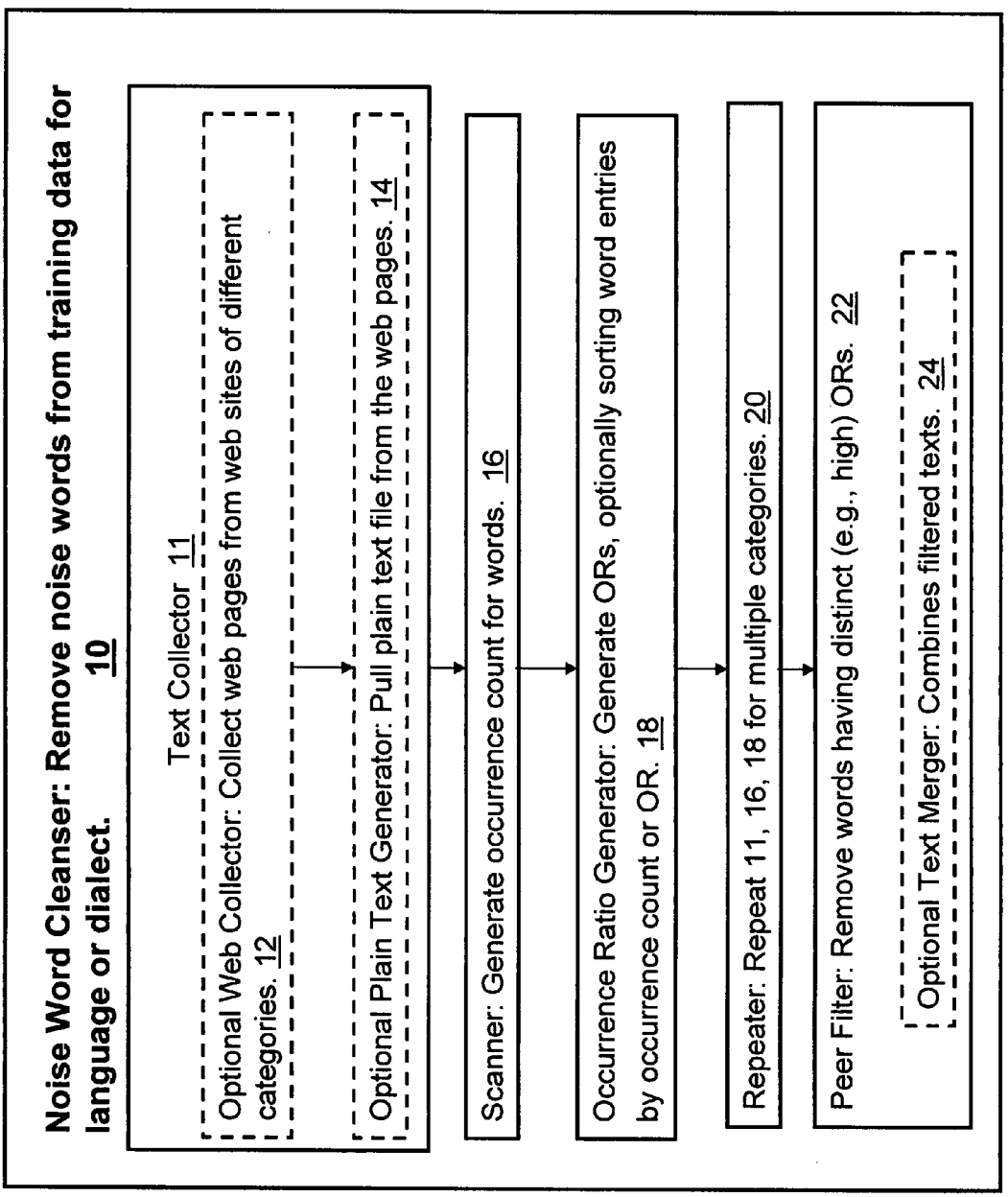
FIG. 1 is a functional block diagram of aspects of an embodiment of the present invention, with optional portions shown in phantom.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

As used in this document, the term "computer" is meant to encompass a workstation, person computer, personal digital assistant (PDA), wireless telephone, or any other suitable computing device.

The system and method embodying the present invention may be programmed in any suitable language and technology, such as, but not limited to Hypertext Markup Language (HTML), Active ServerPages (ASP), Javascript, C++; Visual Basic; Java; VBScript; Jscript; BCMAscript; DHTM1; XML and CGI. Any suitable database technology may be employed, such as Microsoft Access, etc.

Briefly described, embodiments of the present invention provide automated removal of noise words and foreign words from text of a particular language, to be used to train automated language identifiers, such as the Rosette® Language Identifier (RLI) available from Basis Technology Corporation, Cambridge, Mass. The instant inventors have recognized that the occurrence ratio of unique words in a given language document has substantial consistency. These embodiments have been configured to effectively parse the training text into individual words, count the number of occurrences of each unique word in the training text, and to generate an occurrence ratio (OR) of each word. This OR is calculated by dividing the occurrence count of the word in the training text by the total number of words in the training text.

Noise words are detected by comparing the occurrence ratio of a word in the training text with the occurrence ratios of the word in comparison texts in the same language. In the event the word has a high occurrence ratio in the training text, and low occurrence ratios in the comparison texts, then the word may be identified as a noise word and discarded.

Similarly, foreign words are identified by comparing the occurrence ratio of a word in a training text with the occurrence ratios of the word in texts of different languages. A word which has a low occurrence ratio in the training text data, and a high occurrence ratio in a text of a particular foreign language, is identified as a foreign word and may be discarded.

In addition, words common to different dialects of the same general language may be removed to generate dialect specific training texts.

These 'cleaned' training texts in various languages may then be used to train language identification systems such as the RLI system prior to their compilation and shipment to customers.

Specific aspects of the present invention will now be described in greater detail, with reference to the appended Figures.

Referring to FIG. 1, a noise word cleansing module 10 is configured to cleanse noise words from training data for a language. Representative embodiments of this module include a text collector 11 configured to receive and/or retrieve text from any of a variety of sources. For example, module 11 may simply include a conventional database, memory, or other computer storage into which text may be manually or automatically entered. Additionally, or in the alternative, text collector 11 may include a web collection module 12 (shown in phantom) configured to collect web pages from websites of various categories. These web pages may be manually uploaded to text collector 11, or may be automatically uploaded, such as by use of one or more conventional web crawlers (also known as Web spiders or Web robots) that browse the Web for suitable websites. These websites or other information sources may be selected from various categories such as, for example, community sites, government sites, blogs, and news, etc., including specific web domains such as the educational '.edu' domain. Examples of other suitable information categories/sites include publications related to legal, literary, shopping, finance, movies, music, sports, automobiles, technology, travel, real estate, weather, etc., and combinations thereof.

An optional plain text module 14 (shown in phantom) may be used in combination with web collector 12 to remove html tags from the web pages to obtain plain text, and concatenate the plain texts into relatively large text files.

In various applications, the text files used by text collector 11 are at least 2 Megabytes in size, while it may be desirable to use text files of at least 5 Megabytes or more in other applications. Generally speaking, the accuracy of the occurrence ratios and of the ultimate text cleansing provided by the embodiments disclosed herein, may be improved by the use of larger text files, e.g., of 5 Megabytes or more.

In many embodiments module 14 also ensures that the plain texts are authentic paragraphs, rather than mechanically created texts. For example, most web pages tend to contain left side menu links, top header menu links, bottom footer links, and right side adds and links. Module 14 may remove these using any number of conventional tools and/or methodologies, along with html tags. This removal tends to leave only the longer paragraph texts, such as news article main body texts, without link texts or head lines, for collection by Text Collector 11. In addition, module 14 may be configured to avoid mechanically mixing the text of various documents with one another, e.g., to help avoid losing the authenticity of the occurrence ratios of a particular language.

A scanner 16 is configured to scan the text file collected by module 11 to generate occurrence counts for words within the text. In particular embodiments, occurrence counts are generated for every word in the text, although some subset of words may also be used without departing from the scope of the present invention. Any convenient approach may be used to generate the occurrence counts, such as registering each word into a hash table that records both the word and its occurrence count. In this regard, conventional hash tables may be used, e.g., which enable a word to be quickly looked up to determine whether or not it has already been registered in the table. If the word has not been registered, then the word may be added to the table and its occurrence count set at 1. In the event a word is found (i.e., it has already been registered), then the occurrence count of the word may be simply incremented without duplicating the word entry. The table may ignore punctuations, numerics, etc.

An occurrence ratio (OR) generator 18 may then be used to generate the OR for the words counted by module 16. This may be effected by dividing the occurrence counts of each word by nominally the total number of words in the text file, such as using the following Eq. 1:

$$\text{Occurrence ratio} = \text{occurrence count of a word/total sum of occurrence counts of all word entries in a hash table.} \quad \text{Eq. 1}$$

Generator 18 may optionally sort the word entries by any number of parameters, such as, for example, their occurrence counts or ORs. As a further option, Generator 18 may also generate the Accumulated OR ("Acc. OR") for each word, as discussed hereinbelow with respect to Eq. 3A.

Repeater 20 may be used to repeatedly actuate modules 11, 16, and 18 for additional texts (e.g., in other categories within the same language, in foreign languages, and/or in various dialects, as will be discussed in greater detail hereinbelow).

In some embodiments, at least three texts in mutually distinct categories may be used to cleanse noise words from texts of the same language (e.g., English). In other embodiments, at least four texts in mutually distinct categories are used. These embodiments thus respectively generate at least three or four plain text files, with accompanying OR hash tables, in mutually distinct categories. For ease of description, these various texts (or docs) are referred to hereinbelow as D1, D2, D3, and D4.

Peer filter 22 may then be used to remove noise words from the various files. This may be effected by comparing the ORs of words (e.g., in the hash table) of a particular one (e.g., D1) of the files, with ORs of the same words (e.g., in the hash tables) of the other texts (e.g., D2, D3, D4). References D2, D3, D4 thus serve as peers for D1. If the OR for a word in the text (D1) is outside a predetermined range from those of the peers, then the word is determined to be a 'noise' word and may be removed from the text (D1).

In addition to various jargon, misspelled, or foreign words etc., noise words may include those which simply occur more frequently in one particular category than in others. For instance, as discussed in the Example hereinbelow, the words "Carnegie" and "Mellon" tend to occur more frequently in ".edu" domain websites than in other categories, and thus may be desirably removed by Peer Filter 22. In particular embodiments, such as those using at least four sample documents, (i.e., more than two peers) any of these various noise words may be removed in accordance with the following Eq. 2:

$$\text{If the occurrence ratio (of a word in } D1)/10 > \text{peer occurrence ratio in} > 2 \text{ of the peers, then remove the word from the doc } (D1). \quad \text{Eq. 2}$$

This operation peer filter 22 may be repeated for each of the documents collected from the various categories, so that each doc is compared against a peer group including the remaining docs, such as shown in the following Table I.

TABLE I

| | |
|---|---|
| D1 vs. | D2, D3, D4 |
| D2 vs. | D1, D3, D4 |
| D3 vs. | D1, D2, D4 |
| D4 vs. | D1, D2, D3 |

In particular embodiments, peer filter 22 includes an optional text merger 24, which combines the filtered (cleansed) texts (e.g., D1, D2, D3, D4 after comparison to one another as shown in Table I). Text merger 24 thus generates a relatively large composite cleansed text having an OR profile that may be more representative of a particular language than the individual component texts. For example, although "Carnegie" and "Mellon" may have been removed from one of the texts (e.g., D1) due to their unusually high ORs in *.edu websites, these words still exist with a very low (authentic) OR in other English texts. So, removing them as noise words only from D1, and then combining the cleansed D1, D2, D3, D4 texts, generates a composite cleansed text that has a substantially authentic OR profile, i.e., one that includes a non-zero OR for the words that were removed as noise from D1.

As mentioned above, some embodiments may use fewer than four sample documents, such as for applications in which less accuracy is acceptable. In such an embodiment, the following Eq. 2A may be used instead of Eq. 2:

If the occurrence ratio (of a word in $D1$)/10>peer occurrence ratio in>1 of the peers, then remove the word from the doc ($D1$).  Eq. 2A Turning now to FIG. 2, alternate embodiments of the present invention may include aspects of Noise Word Cleanser 10 of FIG. 1 in combination with an optional Foreign Word Cleanser 30 configured to remove foreign words from training data for a particular language. In a particular embodiment, this module 30 includes a Repeater 32 configured to re-execute modules 11, 16, and 18 one or more languages foreign to the texts previously cleansed.

Optionally, module 32 may also re-actuate Repeater 20 and Peer Filter 22 (e.g., including Text Merger 24) to find texts of the foreign language in a variety of distinct categories, and then filter noise words therefrom as described hereinabove with respect to FIG. 1. It should be understood that such use of a plurality of texts in a particular foreign language may enhance accuracy by removing noise words as discussed herein with respect to Peer Filter 22. However, the use of repeater 20 and/or Peer Filter 22 to remove noise words from foreign language documents may not be required in some applications.

Repeater 32 thus uses elements of Noise Word Cleanser 10 (FIG. 1) to generate one or more text files in one or more foreign languages. These text files may also be (optionally) substantially free of same language noise words (i.e., noise words in the same foreign language). Although texts of nominally any language may be provided using this approach, for ease of description, foreign language texts in English, Spanish, French, German, Italian languages are discussed herein, and referred to respectively as EN, ES, FR, DE, IT.

Module 30 also includes a foreign filter 34 configured to compare the OR of word(s) in the hash table of one of the texts (e.g., EN) with those of the other (peer) language texts (e.g., ES, FR, DE, IT). In the event the occurrence ratio for a word in the particular language file (e.g., EN) is outside a predetermined range from those of the peers, then the word is removed from the doc (EN). In particular embodiments, this range is given by the following Eq. 3:

If the occurrence ratio (of a word in, e.g., EN)<$Y$% and the occurrence ratio in any of the other language docs (e.g., ES, FR, DE, IT)>$Z$%, then remove the word from the doc (EN).  Eq. 3

This removal rule is applied to words having an occurrence ratio less than $Y$% to help prevent accidental removal of words that are used frequently in both languages. For example, word 'administration' is common both in English and French.

It should be noted that although Eq. 3 may be used in many embodiments, the following Eq. 3A may be used in alternative embodiments. In this regard, Generator 18 may be configured to generate both an OR and an accumulated OR (Acc. OR) for each word. This 'Acc. OR' is simply the sum of all preceding ORs, ranked from highest to lowest ORs. An example of Acc. OR and OR for a particular text is shown in the following Table II:

TABLE II

| Acc. OR | OR | |
|---|---|---|
| 4.5004 | 4.5004 | the |
| 7.5041 | 3.0037 | of |
| 10.4075 | 2.9034 | and |
| 12.8648 | 2.4573 | to |
| 14.4891 | 1.6243 | in |
| 15.5719 | 1.0828 | is |
| 16.6154 | 1.0435 | that |
| 17.6338 | 1.0184 | for |

The following Eq. 3A is semantically similar to Eq. 3, but may be more flexible in use.

If the Acc.OR (of a word in, e.g., EN)>$L$% and the Acc.OR in any of the other language docs (e.g., ES, FR, DE, IT)<$M$%, then remove the word from the doc (EN).  Eq. 3A This operation of Foreign Word Cleanser 30 may be optionally repeated for each of the various languages, such as shown in the following Table III:

TABLE III

| | |
|---|---|
| EN vs. | ES, FR, DE, IT |
| ES vs. | EN, FR, DE, IT |
| FR vs. | EN, ES, DE, IT |
| DE vs. | EN, ES, FR, IT |
| IT vs. | EN, ES, FR, DE |

Turning now to FIG. 3, embodiments of the present invention may also include an optional Dialect or Shared Word module 36 configured to cleanse shared words from training data for a language that has dialects. This module includes a Repeater 38 configured to re-execute modules 11, 16, and 18 of module 10 for various languages that have dialects.

Optionally, Shared Word Cleanser 36 may also re-actuate Repeater 20 and Peer Filter 22 (e.g., including Text Merger 24) to find texts of the particular dialects in a variety of distinct categories, and then filter noise words therefrom as described hereinabove with respect to FIG. 1. It should be understood that such use of a plurality of texts in a particular dialect may enhance accuracy by enabling the removal of noise words as discussed hereinabove with respect to Peer Filter 22. However, the use of repeater 20 and/or Peer Filter 22 to remove noise words from foreign dialect documents may not be required in some applications.

This approach serves to generate text files in at least two dialects of interest. Optionally, these text files are substantially free from noise words. Although nominally any language/dialect may be used, for ease of description, Indonesian and Malay are used in the following description as exemplary languages, referred to, respectively, as IN, MS.

Once the (optionally clean) text files for each dialect have been generated by module 38, Dialect filter 40 may be used to remove words that are shared by both dialects. This may be accomplished by comparing the OR of word entries in the IN hash table with the OR of the same word entries in the MS hash table.

In the event the occurrence ratio for a word in the particular dialect text (e.g., IN) is within a predetermined range of those of the other dialect (i.e., peers), then the word is removed from the text (IN). This helps to create training texts that more dialect-specific. In various embodiments, this range is given by the following Eq. 4:

If (Absolute Value of (occurrence ratio of IN−occurrence ratio of MS)/(occurrence ratio of IN+occurrence ratio of MS)<or=K %, then remove the word from the doc(IN).     Eq. 4

It should be noted that the percentages discussed herein, e.g., Y %, Z %, K %, L %, M % may be variable depending on the particular application. For example, in many embodiments, Y % may be anywhere within a range of about 0.0007% to about 100%, Z % may be within a range of about 0% to about 5%, and K % may be within a range of about 0% to about 60%. L % may be within a range of about 0% to about 90%, and M % may be within a range of about 5% to about 100%. In other embodiments in which enhanced accuracy may be desired, Y % may range from about 0.025% to about 0.055%, Z % may be within a range of about 0.002% to about 0.007%, and K % may be within a range of about 45% to about 55%.

In the following exemplary embodiment, the values used were Y %=0.03%, Z %=0.002%, K %=50%, L %=60%, and M %=90%.

The following illustrative example is intended to demonstrate certain aspects of the present invention. It is to be understood that this example should not be construed as limiting.

EXAMPLE

As discussed hereinabove, it has been found that texts written in particular languages tend to have a relatively consistent occurrence ratio of frequently used words. It has also been found that as the occurrence of words increases, their occurrence ratio patterns become more consistent. Conversely, words of lower occurrence tend to be jargon, misspelled or foreign words. For instance, the following Table III is a list of commonly occurring words with their occurrence ratios, in documents from three distinct categories as determined by modules 11 to 20 of FIG. 1.

TABLE III

| EDU | | BOOK | | LAW | |
|---|---|---|---|---|---|
| 4.5004 | the | 4.1772 | the | 5.4888 | the |
| 3.0037 | of | 2.7073 | of | 3.6267 | of |
| 2.9034 | and | 2.8171 | and | 2.2323 | and |
| 2.4573 | to | 2.2008 | to | 2.5898 | to |
| 1.6243 | in | 1.4443 | in | 1.6613 | in |
| 1.0828 | is | 0.8697 | is | 0.9719 | is |
| 1.0435 | that | 0.6837 | that | 1.3166 | that |
| 1.0184 | for | 1.0155 | for | 0.8894 | for |
| 0.703 | The | 0.8162 | The | 0.6778 | The |

In addition, documents collected from a specific category may include words (e.g., properly spelled and non-jargon) that occur with more frequency than in other categories, i.e., with occurrence ratios that don't match those of other categories. As shown in the following Table IV, examples of such words include 'Carnegie' and 'Mellon' in documents collected from .edu domain websites. These words were removed by Peer Filter 22 in this Example.

TABLE IV

| EDU | | BOOK | | LAW | |
|---|---|---|---|---|---|
| 0.1859 | your | 0.3589 | your | 0.1034 | your |
| 0.1844 | Carnegie | 0.0156 | Carnegie | 0.0006 | Carnegie |
| 0.1733 | what | 0.1161 | what | 0.1036 | what |
| 0.1704 | Center | 0.0359 | Center | 0.034 | Center |
| 0.1691 | students | 0.0273 | students | 0.0336 | students |
| 0.1671 | but | 0.1683 | but | 0.1794 | but |
| 0.1621 | Mellon | 0.015 | Mellon | 0.0005 | Mellon |
| 0.1562 | This | 0.1598 | This | 0.0983 | This |

As discussed hereinabove, non-English profiles tend to be slightly contaminated by English words. This contamination tends to adversely affect language identification accuracy in many conventional language identifiers. Embodiments of the present invention have been used to successfully cleanse English words from training data in 30+ languages. This has been shown to significantly improve the accuracy of language identifiers such as the above-referenced RLI system.

It should be understood that any of the features described with respect to one of the embodiments described herein may be used with any other of the embodiments described herein without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. An automated method for debugging training data used to train an automated language identifier, said method comprising:
    (a) collecting a text written in a predetermined language;
    (b) generating an occurrence count for each of a plurality of words, by counting the number of times each of said words is found within the text;
    (c) generating an occurrence ratio (OR) of each of said words by dividing the occurrence count by substantially the total number of words in each text;
    (d) repeating said (a), (b), and (c) to generate ORs for a plurality of texts; and
    (e) filtering, by a computer, words from one of said texts which have an occurrence ratio that is substantially distinct from corresponding occurrence ratios of an other of said texts, to generate a clean text.

2. The method of claim 1, wherein said repeating (d) is effected for a plurality of texts written in said predetermined language.

3. The method of claim 2, wherein said filtering (e) comprises filtering words from one of said texts which have an occurrence ratio that is higher than a corresponding occurrence ratio in at least one other of said texts, to generate a clean text.

4. The method of claim 1, wherein said collecting (a) comprises collecting a web page from a website of a predetermined category.

5. The method of claim 4, wherein said collecting (a) comprises separating text files from said collected web pages.

6. The method of claim 4, wherein said repeating (d) comprises repeating said (a), (b), and (c) for websites of another predetermined category.

7. The method of claim 6, wherein said predetermined category and said other predetermined category are selected from the group consisting of:
educational, legal, literary, shopping, news, blog, community, government, finance, movies, music, sports, automobiles, technology, travel, real estate, weather, and combinations thereof.

8. The method of claim 1, comprising repeating said filtering (e) for each of said plurality of texts, to generate a plurality of clean texts.

9. The method of claim 8, comprising merging said plurality of clean texts after said filtering (e) to generate a composite clean text.

10. The method of claim 1, wherein the occurrence ratio (OR) is determined by the following:

Occurrence ratio=occurrence count of a word/total sum of occurrence counts of all word entries in a hash table.

11. The method of claim 8, wherein the plurality of texts comprises at least four texts, and said filtering (d) is effected in accordance with the following:

If OR of the one text/10>OR of more than 2 of the other texts, then remove word from the one text.

12. The method of claim 8, wherein the plurality of texts comprises at least three texts, and said filtering (d) is effected in accordance with the following:

If OR of the one text/10>OR of more than 1 of the other texts, then remove the word from the one text.

13. The method of claim 1, comprising:
repeating said (a), (b), and (c) to generate ORs for at least one other predetermined language to generate a foreign text.

14. The method of claim 13, comprising:
repeating said (d) and (e) for a plurality of texts in said other predetermined language to generate a clean foreign text.

15. The method of claim 14, comprising repeating said filtering (e) for each of said plurality of texts, to generate a plurality of clean foreign texts.

16. The method of claim 15, comprising merging said plurality of clean foreign texts after said filtering (e) to generate a composite clean foreign text.

17. The method of claim 13, comprising:
comparing the occurrence ratios of the clean text with the occurrence ratios of the foreign text; and
removing words from the clean text which have an OR less than the OR of the foreign text, to generate foreign-word-free clean text.

18. The method of claim 17, wherein said removing words is effected in accordance with the following:

If OR in the clean text<Y % and the OR in the foreign text>Z %, then remove the word from the clean text, where Y % is within a range of:
at least about 0.0007%; and
up to about 100%; and
Z % is within a range of at least about 0%; and
up to about 5%.

19. The method of claim 18, wherein:
Y % is within a range of:
at least about 0.025%; and
up to about 0.055%; and
Z % is within a range of at least about 0.002%; and
up to about 0.007%.

20. The method of claim 17, comprising generating an accumulated OR (Acc. OR) for each word by adding the ORs of preceding words, as ranked from highest to lowest ORs, wherein said removing words is effected in accordance with the following:

If the Acc.OR (of a word in, e.g., EN)>L % and the Acc.OR in any of the other language docs (e.g., ES, FR, DE, IT)<M %, then remove the word from the doc (EN).

where L % is within a range of at least about 0%;
up to about 90%; and
M % is within a range of about 5%;
to about 100%.

21. The method of claim 1, wherein said predetermined language is a dialect, and comprising:
repeating said (a), (b), and (c) to generate ORs for at least one other dialect to generate at least one other dialect text.

22. The method of claim 21, comprising:
repeating said (d) and (e) for a plurality of texts in said other dialect to generate a clean other dialect text.

23. The method of claim 22, comprising repeating said filtering (e) for each of said plurality of texts in said other dialect, to generate a plurality of clean other dialect texts.

24. The method of claim 23, comprising merging said plurality of clean other dialect texts after said filtering (e) to generate a composite clean other dialect text.

25. The method of claim 21, comprising:
comparing the occurrence ratios of the clean text with the occurrence ratios of the other clean text; and
removing words from the one clean text which have an occurrence ratio within a predetermined range of the occurrence ratio of the other clean text, to generate substantially dialect-specific clean text.

26. The method of claim 25, wherein said removing words is effected in accordance with the following:

If (Absolute Value of (OR of the one clean text−OR of the other clean text)/sum OR of both clean texts) is<or =K %, then remove the word from the one clean text where K % is within a range of:
at least about 0%; and
up to about 60%.

27. The method of claim 26, where K % is within a range of:
at least about 45%; and
up to about 55%.

28. An automated system for debugging training data used to train an automated language identifier, said system comprising:
a text collection module configured for collecting a plurality of texts in a single predetermined language;
a scanning module configured for generating an occurrence count for each of a plurality of words, by counting the number of times each of said words is found within the text;

an occurrence ratio generator configured to divide the occurrence count for each word by substantially the total number of words in each text;

a filter configured to remove words from one of said texts which have occurrence ratios higher than corresponding occurrence ratios of an other of said texts, to generate a clean text.

29. The system of claim 28, wherein said text collection module comprises a web collection module configured to collect web pages from websites of mutually distinct categories.

30. The system of claim 29, wherein said mutually distinct categories are selected from the group consisting of:

educational, legal, literary, shopping, news, blog, community, government, finance, movies, music, sports, automobiles, technology, travel, real estate, weather, and combinations thereof.

31. The system of claim 29, wherein said text collection module comprises a plain text generator configured to pull text files from said collected web pages.

32. An article of manufacture for debugging training data used to train an automated language identifier, said article of manufacture comprising a computer usable medium having a computer readable program code embodied therein, said computer usable medium having computer readable program code for:

(a) collecting a text written in a predetermined language;

(b) generating an occurrence count for each of a plurality of words, by counting the number of times each of said words is found within the text;

(c) generating an occurrence ratio (OR) of each of said words by dividing the occurrence count by substantially the total number of words in each text;

(d) repeating said (a), (b), and (c) to generate ORs for a plurality of texts written in said predetermined language; and (e) filtering, by a computer, words from one of said texts which have an occurrence ratio that is higher than corresponding occurrence ratios of an other of said texts, to generate a clean text.

* * * * *